US012561468B2

(12) United States Patent
Varga et al.

(10) Patent No.: US 12,561,468 B2
(45) Date of Patent: **\*Feb. 24, 2026**

(54) METHODS AND SYSTEMS FOR TENANCY IN A MULTITENANT ENVIRONMENT

(71) Applicant: Open Text SA ULC, Halifax (CA)

(72) Inventors: Peter Varga, Markham (CA); Nicholas Edward Scott, Waterloo (CA)

(73) Assignee: OPEN TEXT SA ULC, Halifax (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 18/758,340

(22) Filed: Jun. 28, 2024

(65) Prior Publication Data

US 2024/0403472 A1 Dec. 5, 2024

Related U.S. Application Data

(63) Continuation of application No. 18/165,164, filed on Feb. 6, 2023, now Pat. No. 12,050,709, which is a continuation of application No. 16/895,948, filed on Jun. 8, 2020, now Pat. No. 11,574,068.

(51) Int. Cl.
*G06F 21/62* (2013.01)
*H04L 9/40* (2022.01)

(52) U.S. Cl.
CPC ........ *G06F 21/6218* (2013.01); *H04L 63/102* (2013.01); *H04L 63/105* (2013.01)

(58) Field of Classification Search
CPC .. G06F 21/6218; H04L 63/102; H04L 63/105
See application file for complete search history.

(56) References Cited

U.S. PATENT DOCUMENTS

| | | | | | |
|---|---|---|---|---|---|
| 9,210,178 | B1 * | 12/2015 | Roth | ..................... | H04L 63/105 |
| 10,673,628 | B1 * | 6/2020 | Shtop | ........................ | H04L 9/32 |
| 11,061,548 | B1 * | 7/2021 | Catakli | ................... | H04L 67/75 |
| 11,113,294 | B1 * | 9/2021 | Bourbie | ............ | G06F 16/24568 |
| 11,113,459 | B1 * | 9/2021 | Olsson | ................... | G06N 20/00 |
| 11,140,169 | B1 * | 10/2021 | Hamel | .................. | H04L 63/068 |
| 11,574,068 | B2 * | 2/2023 | Varga | ................... | H04L 63/105 |
| 12,050,709 | B2 * | 7/2024 | Varga | ................. | G06F 21/6218 |
| 2012/0079134 | A1 * | 3/2012 | Outhred | .............. | H04L 12/4633 |
| | | | | | 709/244 |
| 2012/0167178 | A1 * | 6/2012 | Rauh | ....................... | G06F 16/80 |
| | | | | | 726/4 |

(Continued)

*Primary Examiner* — Jason Chiang
(74) *Attorney, Agent, or Firm* — Sprinkle IP Law Group

(57) ABSTRACT

Systems, methods and computer program products for controlling access to an organization's data in a multitenant environment are provided. An organization hierarchy is defined at a multitenant platform, the organization hierarchy comprising an organization and a plurality of sites owned by the organization, each of the plurality of sites representing a data isolation boundary for the organization's data. The sites are associated with subscriptions to applications of the multitenant platform. The organization can designate user partitions within the sites, each user partition designating a corresponding set of site users and a corresponding authentication service. The multitenant platform enables access to each subscription of a site only if a site user is authenticated by the authentication service designated in the user partition corresponding to the site user.

20 Claims, 9 Drawing Sheets

(56) References Cited

U.S. PATENT DOCUMENTS

| | | | | |
|---|---|---|---|---|
| 2013/0031613 A1* | 1/2013 | Shanabrook | | G06F 21/552 |
| | | | | 707/769 |
| 2013/0086670 A1* | 4/2013 | Vangpat | | H04L 63/0815 |
| | | | | 726/8 |
| 2013/0111558 A1* | 5/2013 | Sangubhatla | | H04L 63/102 |
| | | | | 726/4 |
| 2014/0013409 A1* | 1/2014 | Halageri | | H04L 63/0815 |
| | | | | 726/8 |
| 2015/0269390 A1* | 9/2015 | Schaefer | | G06F 21/604 |
| | | | | 707/781 |
| 2016/0080502 A1* | 3/2016 | Yadav | | H04L 67/52 |
| | | | | 709/227 |
| 2016/0132808 A1* | 5/2016 | To | | G06Q 10/06315 |
| | | | | 705/7.25 |
| 2017/0126742 A1* | 5/2017 | Hopkins | | H04L 63/105 |
| 2017/0293501 A1* | 10/2017 | Barapatre | | G06F 9/5088 |
| 2018/0167378 A1* | 6/2018 | Kostyukov | | H04L 63/0815 |
| 2018/0239766 A1* | 8/2018 | Gamble | | G06F 3/0486 |
| 2019/0058709 A1* | 2/2019 | Kempf | | G06F 21/64 |
| 2019/0222988 A1* | 7/2019 | Maes | | H04L 41/5054 |
| 2019/0386923 A1* | 12/2019 | Ingerman | | H04L 47/24 |
| 2020/0177597 A1* | 6/2020 | Kabesa | | G06F 21/41 |
| 2020/0186501 A1* | 6/2020 | Neystadt | | H04L 63/08 |
| 2020/0257516 A1* | 8/2020 | Totale | | G06F 8/71 |
| 2020/0358752 A1* | 11/2020 | Palmer | | H04L 63/08 |
| 2020/0402087 A1* | 12/2020 | McGinnis | | G06Q 40/04 |
| 2021/0089357 A1* | 3/2021 | Garaga | | G06F 16/23 |
| 2021/0112059 A1* | 4/2021 | Heldman | | H04L 63/0807 |
| 2021/0281428 A1* | 9/2021 | Kempf | | G06F 21/64 |
| 2021/0383005 A1* | 12/2021 | Varga | | H04L 63/105 |
| 2021/0385129 A1* | 12/2021 | Shadbolt | | H04L 63/20 |
| 2022/0030780 A1* | 2/2022 | Peiffer | | A01G 13/24 |
| 2023/0185948 A1* | 6/2023 | Varga | | G06F 21/6218 |
| | | | | 726/1 |

* cited by examiner

300

CLOUD BASED MULTITENANT PLATFORM

APPLICATIONS — 302

306

308 — USERS          SITES          SUBSCRIPTIONS — 304

310 — USER PARTITIONS     ORGANIZATIONS — 307

312 — AUTHENTICATION SCHEMES

314 — DS          ETS — 316

326          326

TOKEN          TOKEN 322          328

LOGIN

315

320

| SITE PARTITION | CHILD PARTITIONS | USERS |
|---|---|---|
| Org_1 | org_1-Native | |
| | | srini@org1.com |
| | org_1-SAML1<br>domain: org1.com<br>idp: org1.com | |
| | | nick@org1.com |
| | | ravi@org1.com |
| | org_1-SAML2<br>domain: org1.eu<br>idp: org1.eu | |
| | | ross@org1.eu |
| | org_1-SAML3<br>domain: <blank><br>idp: org1.okta.com | |
| | | ted@org3.com |
| | | john@org4.com |
| org_2 | org_2-Native | |
| | | srini@org1.com |
| | | bill@org2.com |
| | org_2-SAML1<br>domain: org2.com<br>idp: org2.com | |
| | | mark@org2.com |
| | org_2-SAML2<br>domain: <blank><br>idp: org2.ping.com | |
| | | jill@org4.com |
| | | ted@org3.com |
| org_3 | org_3-Native | |
| | | ted@org3.com |
| org_4 | org_4-Native | |
| | | jill@org4.com |
| | | john@org4.com |

FIG. 4A

| AC/ETS | | | | |
|---|---|---|---|---|
| SITE | SUBSCRIPTIONS | USERS | | |
| | | USER | SITE ID | PARTITION ID |
| Org_1 (org1.com) | | | | |
| | Org1-CFS1 | srini@org1.com | Org_1 | Org_1-Native |
| | Org1-CFS2 | nick@org1.com | Org_1 | Org_1-SAML1 |
| | Org1-CC1 | ravi@org1.com | Org_1 | Org_1-SAML1 |
| | | ross@org1.eu | Org_1 | Org_1-SAML2 |
| | | ted@org3.com | Org_1 | Org_1-SAML3 |
| | | john@org4.com | Org_1 | Org_1-SAML3 |
| org_2 (org2.com) | | bill@org2.com | org_2 | Org_2-Native |
| | Org2-CFS1 | srini@org1.com | org_2 | Org_2-Native |
| | Org2-CFS2 | mark@org2.com | org_2 | Org_2-SAML1 |
| | Org2-CC1 | jill@org4.com | org_2 | Org_2-SAML2 |
| | | ted@org3.com | org_2 | Org_1-SAML2 |
| | | | org_2 | |
| org_3 (org3.com) | | | | |
| | Org3-CFS1 | ted@org3.com | org_3 | Org_3-Native |
| org_4 (org4.com) | | | | |
| | Org4-CFS1 | john@org4.com | org_4 | Org_4-Native |
| | | jill@org4.com | org_4 | Org_4-Native |
| | | | | |

ADMIN CENTER

| 3 SITES | 5 SUBSCRIPTIONS | 1.5k USERS |
|---------|-----------------|------------|
| ORGANIZATION 1 | | |

Org_1

Org_1b

Org_1c

Org1-CFS1

Org1-CFS3

Org1-CFS5

Org1-CFS2

Org1-CC1

FIG. 7

METHODS AND SYSTEMS FOR TENANCY IN A MULTITENANT ENVIRONMENT

RELATED APPLICATION(S)

This application is a continuation of, and claims a benefit of priority under 35 U.S.C. 120 of, U.S. patent application Ser. No. 18/165,164 filed Feb. 6, 2023, issued as U.S. Pat. No. 12,050,709, entitled "METHODS AND SYSTEMS FOR TENANCY IN A MULTITENANT ENVIRON-MENT," which is a continuation of, and claims a benefit of priority under 35 U.S.C. 120 of, U.S. patent application Ser. No. 16/895,948 filed Jun. 8, 2020, issued as U.S. Pat. No. 11,574,068, entitled "METHODS AND SYSTEMS FOR TENANCY IN A MULTITENANT ENVIRONMENT," which are hereby incorporated herein for all purposes.

TECHNICAL FIELD

This disclosure relates generally to the field of multitenant systems. More particularly, embodiments relate to providing access to applications in a multitenant system.

BACKGROUND OF THE RELATED ART

Traditionally, users have run applications on their own computers. In the context of enterprise computing, users have run applications on servers that are located on the premises of the organization or enterprise (e.g., in server machines that physically reside in a building of the enterprise). This is sometimes referred to as "on-premises" or simply "on-prem". For example, enterprise class systems such as enterprise content management (ECM) systems may utilize on-premise content servers to store and manage an organization or enterprise's digital assets (e.g., content and documents). To protect these managed objects, the content server conventionally operates behind the enterprise's firewall, and is configured so that only authorized users within the enterprise may have secure access to the managed objects.

It may, however, be desirable for users associated with the enterprise to collaborate and/or share enterprise content (documents or other managed objects) with other users. External users (those who are not associated with the enterprise or who are not on-premise) are generally not authorized to access the enterprise's applications or content, so they cannot normally view and/or edit any of the restricted files managed by the enterprise's content server.

When the need arises for an external user to review and/or edit a file, one common option is for an enterprise user to transfer a copy of the file to a location that is accessible by the external user. For instance, the enterprise user may log into the enterprise content server from within the enterprise network where the content server resides, retrieve the file, and share a copy of the file with the external user via email or through a cloud-based storage system that is open to the public. Once that copy is shared outside of the enterprise network, it is no longer under management by the enterprise content server, so the content server has no way of tracking the shared copy, getting the shared copy back to the content server, and/or updating the original file to reflect any changes made to the shared copy.

More frequently, enterprise class systems have moved toward cloud hosting for their computing operations. These systems may use applications that are executed in a multi-tenant environment. The cloud-based environment may store content for multiple different enterprises, and therefore implements security measures to ensure that only authorized users associated with a particular enterprise are allowed to access the content owned by that enterprise. The content may, for instance, be encrypted with an encryption key that is controlled by the corresponding enterprise. The enterprise may configure access permissions to the managed objects to allow access by enterprise users to the content.

User accounts are typically defined by email address and exist globally in the multitenant platform. In other words, each user has a single global identity on the multitenant platform. Due to the global nature of user accounts, a user typically authenticates with the platform using a single mechanism. The authentication mechanism is typically con-trolled by the primary tenant of the user (that is, the tenant that owns the user account). Thus, while a user account can participate in multiple tenants, the tenants share the same user account and the authentication scheme for the user is controlled by the primary tenant for the user account. For example, although an enterprise may selectively authorize particular external users to access particular data, the authen-tication of these users is normally determined by their own respective domains (which are external to the enterprise), rather than by the enterprise itself. Consequently, there may be a scenario in which a user (who is external to an enterprise) may be authenticated by a domain that only requires a username and a simple password, but the user may be given access to data that is owned by the enterprise, which requires stronger passwords and two-factor authenti-cation. As a result, the external user may be allowed access to the data, even though the user was authenticated under much less stringent authentication requirements than those of the enterprise.

It may also be difficult to control the authentication of external users who may need access to managed objects owned by the enterprise in order to collaborate with internal enterprise users.

SUMMARY OF THE DISCLOSURE

One embodiment provides a method for controlling access to data in a multitenant environment. The method comprises providing a multitenant platform and executing one or more applications on the multitenant platform. The method further includes defining an organization hierarchy in the multitenant platform, the organization hierarchy com-prising an organization and a plurality of sites owned by the organization, each of the plurality of sites representing a data isolation boundary for the organization's data on the mul-titenant platform. Each of the plurality of the plurality of sites may be associated with one or more subscriptions to the one or more applications. The method can further comprise providing a user interface providing a unified view of the plurality of sites of the organization. The multitenant plat-form enables site-level subscription-based access to the one or more applications. According to one embodiment, the multitenant platform enables the organization to designate a plurality of user partitions within a site of the plurality of sites, each user partition designating a corresponding set of site users and a corresponding authentication service. The multitenant platform may further enable the organization to authorize a plurality of site users associated with the site to access the one or more applications associated with the one or more subscriptions associated with that site. For each site user of the plurality of site users associated with the site, the multitenant platform may further enable access to each of the one or more subscriptions associated with the site only if the site user is authenticated by the corresponding authentication service designated in a user partition corresponding to the site user.

Another embodiment comprises a computer program product for controlling access to data in a multitenant environment, the computer program product comprising a non-transitory computer-readable medium storing instructions executable by a processor to cause the processor to perform: providing a multitenant platform; executing one or more applications on the multitenant platform; defining an organization hierarchy on the multitenant platform, the organization hierarchy comprising an organization and a plurality of sites owned by the organization, each of the plurality of sites representing a data isolation boundary for data of the organization, each of the plurality of sites associated with one or more subscriptions to the one or more applications; providing a user interface providing a unified view of the plurality of sites of the organization; enabling, by the multitenant platform, site-level subscription-based access to the one or more applications; enabling, by the multitenant platform, the organization to designate a plurality of user partitions within a site of the plurality of sites, each user partition designating a corresponding set of site users and a corresponding authentication service; enabling, by the multitenant platform, the organization to authorize a plurality of site users associated with the site to access the one or more applications associated with the one or more subscriptions associated with that site; and for each site user of the plurality of site users associated with the site, enabling, by the multitenant platform, access to each of the one or more subscriptions associated with the site only if the site user is authenticated by the corresponding authentication service designated in a user partition corresponding to the site user.

Another embodiment comprises a system for controlling access to data in a multitenant environment, the system comprising: a processor; a data repository communicatively coupled to the processor; and a non-transitory computer-readable medium. The non-transitory computer readable medium stores instructions which are executable by the processor to cause the processor to perform: providing a multitenant platform; executing one or more applications on the multitenant platform; defining an organization hierarchy on the multitenant platform, the organization hierarchy comprising an organization and a plurality of sites owned by the organization, each of the plurality of sites representing a data isolation boundary for data of the organization, each of the plurality of sites associated with one or more subscriptions to the one or more applications; providing a user interface providing a unified view of the plurality of sites of the organization; enabling, by the multitenant platform, site-level subscription-based access to the one or more applications; enabling, by the multitenant platform, the organization to designate a plurality of user partitions within a site of the plurality of sites, each user partition designating a corresponding set of site users and a corresponding authentication service; enabling, by the multitenant platform, the organization to authorize a plurality of site users associated with the site to access the one or more applications associated with the one or more subscriptions associated with that site; and for each site user of the plurality of site users associated with the site, enabling, by the multitenant platform, access to each of the one or more subscriptions associated with the site only if the site user is authenticated by the corresponding authentication service designated in a user partition corresponding to the site user.

According to one embodiment, the multitenant platform enables a single email address to be used to simultaneously access a first subscription of the first organization as a first user and a second subscription of a second organization as a second user, wherein access of the first user to the first subscription is isolated from access of the second user to the second subscription.

According to one embodiment, the multitenant platform enables a single email address to be used to simultaneously access a first subscription of the first organization as a first user and a second subscription of the first organization as a second user, wherein access of the first user to the first subscription is isolated from access of the second user to the second subscription.

According to one embodiment, at least one of the plurality of user partitions includes an external user external to the organization.

According to one embodiment, at least one of the plurality of user partitions comprises a user having an email address that has a domain which is different than a domain of the site.

According to one embodiment, each user in the plurality of site users is defined by a combination of an email address and an identifier for the first site.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 4A-4B depict a set of tables illustrating the partitioning of users in accordance with some embodiments.

FIG. 7 is a diagrammatic representation of one embodiment of providing a unified view of an organization.

DETAILED DESCRIPTION

Figure 1:
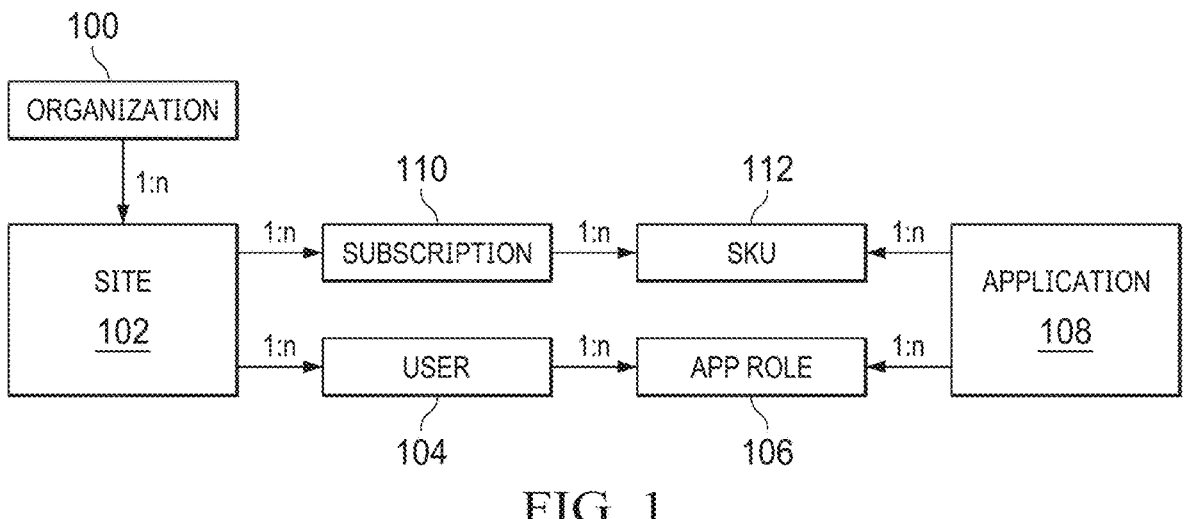
FIG. 1 depicts a diagrammatic representation of one embodiment of a model for controlling data access in a multitenant environment.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments disclosed herein address the issue of how to isolate data while allowing colleagues to share data in a multitenant platform. Embodiments provide a mechanism to secure data by implementing data isolation at the site level within an organization. Embodiments may meet several needs that are not served by current systems. For example, it is desirable to enable one person with a single corresponding email address to access to different sites as two different users, each of which is under the control of the same organization, where data is isolated between the two sites to provide the same person with different level of access to different data of the organization. Moreover, it is desirable to enable one person with a single corresponding email address to access two different sites as two different users, each of which is under the control of a separate organization, where data is isolated between the two sites. It is further desirable to enable developers to build applications that can share data within a single organization. It is also desirable to enable two different organizations that can access a particular application to share data across the organizations.

Embodiments disclosed herein allow organizations to define multiple sites and implement isolation of users by enabling user partitioning at a site-level. This enables the control of users at the site level, rather than at the organizational level. User partitions are associated with individual sites, and the individual sites determine the access that associated users are granted to data for the corresponding sites. The user partitioning enables the sites to control the authentication required for users accessing data through the corresponding sites in order to maintain the desired level of security.

Embodiments disclosed herein can provide a customer with control of a user's experience on the application when it is used to access the customer's data. The user's experience may be through a web interface, a mobile device, or a desktop device. In the web-based experience, a user may access an application through a domain name controlled by the customer and the customer controls the authentication of the user.

The customer has control over the users who are allowed to access their data. This may be accomplished by, for example, the customer explicitly associating individuals in both internal and external organizations with sites that are allowed to access the data. The customer may remove individuals from the site or otherwise update the site in order to immediately change the ability of individual users to access the data. The customer in this embodiment has control over the authentication rules that govern access by users to the customers data. This may include, for example, controlling the rules for authentication (e.g., two-factor authentication, password strength, etc.).

Embodiments disclosed herein provide technical solutions and benefits to the problems noted above, such as by partitioning users at the site level so that user access to data and applications can be differentiated between groups of users and so that user authentication can be controlled for both internal and external users of the system. Data owners can exercise this control both through the applications, and external to the applications. External control (via an entry point to the application, such as a login page) can be exercised without having to go through the application itself and may provide faster and more convenient means to control access.

FIG. 1 depicts a diagrammatic representation of one embodiment of a model for controlling data access in a multitenant environment. As noted above, there may be one or more applications 108 executing on the multitenant platform. The multitenant platform enables site-level, subscription-based access to the applications 108. More particularly, each of these applications 108 is accessible through a subscription 110 to the application. A subscription 110 is associated with a specific site 102 which may have multiple users 104 associated with it. The users associated with a site 102 are associated with an application 108 through a site's subscription 108 and may therefore be considered subscription users who are authorized to access the application 108. The subscription users may each be included in one or more user partitions that may be associated with the site. These user partitions may be associated with corresponding authentication services and levels of access, so that when a tenant subscriber assigns a particular user to a specific user partition, the user will be authenticated according to the authentication service designated in the user partition and given the levels of access that are associated with the user partition.

An organization hierarchy can be defined on a multitenant platform. The organization hierarchy may include, for example, an organization 100, sites 102 owned by the organization, subscriptions 110 associated with the sites 102 in the organization 100 and users 110 associated with the organization (for example associated with sites 102 of the organization 100). Organization hierarchies can be defined for any number of organizations. In general, an organization 100 is the top-level entity for a multi-site tenant. An organization 100 is associated with a legal entity which the provider of the multitenant platform agrees to provide services. For example, an organization may correspond to an enterprise. An organization 100 may correspond to a customer of the multitenant platform. Each organization 100 defined in the multitenant platform may be associated with a separate authentication (e.g., a separate AuthN). An organization 100 may have organization admin roles to specify who can add, remove, configure, and report on users in the organization or configure the organization subtree (e.g., add, remove, configure sites, subscriptions, application roles).

An organization 100 owns one or more sites 102. A site 102 may be considered to be a tenant. A site can represent any organizational unit for which organization 100 wishes to establish a data isolation boundary. For example, sites may represent environments (e.g., testing, production), regions (North America, Europe) or other aspects. According to one embodiment, a site 102 is a grouping of subscriptions 110 and site administrators who can modify subscriptions 110, for example purchase additional subscriptions 110, remove subscriptions or take other actions with respect to subscriptions 110 based on configuration. Each site 102 is associated with a unique SiteID that is used to access subscribed applications and services. As noted above, a site 102 provides a data isolation boundary. According to one embodiment, subscriptions 110 within a site 102 can access each other's data, but no data is shared across site boundaries. In addition to providing greater control over data isolation, one advantage of the organization-site hierarchy is that an organization admin can define org-wide policies at the organization 100 level that are effective to all sites 102 associated with the organization.

A site 102 has associated users 104. The same person having the same identifying information may be considered a different user for each site with which the user is associated. For example, a user may be uniquely defined by an {email, SiteID} pair. In such an embodiment then, the multitenant platform can allow the same email address to be used for two different users. Thus, one person with a single corresponding email address can be considered two different users for two different sites. User accounts thus exist at the site level and a single email address can exist in multiple sites as independent accounts that can have unique attributes or credentials. Users can be assigned one or more application roles 106 and each application 108 may support one or more application roles 106.

Each site may have subscriptions 110 to one or more applications 108 that are executing on the multitenant platform. According to one embodiment, a subscription 110 represents an agreement between the provider of the multitenant platform and an entity (e.g., legal entity) associated with organization 100 for applications or services provided by the multitenant platform to subscription users under, for example, a service level agreement (SLA). According to one embodiment, a subscription 110 is associated one or one applications 108 or one or more services that are available on the cloud-based multitenant platform. More particularly, a subscription 110 is associated with one or more stockkeeping units (SKUs) 112, where each SKU 112 is a code that identifies an application 108 (or version of an application). Each application 108 may have one or more SKUs 112. A subscription 110 may have a subscription list of users who have access to the subscription. In some cases, the subscriptions users may be assigned application roles for the subscription.

A subscription 110 can have a subscription administrator who can add or remove users to a subscription list, assign users to application roles for the subscription, configure options for the subscription 110, such as billable options on the subscription or other options, or take other administrative actions with respect to the subscription 110. Management of a subscription list can be delegated and constrained such that it can be managed at the organization level and inherited down or delegated to a set administrator or subscription administrator for management. In some embodiments, a user 104 associated with a site 102 is automatically added to the subscription lists of subscriptions 110 associated with the site 102.

According to one embodiment, each subscription 110 to an application 108 is associated with a unique DNS domain. This unique domain is used as an entry point for a user to obtain service from the application and thereby access the tenant's (i.e., the site's) data. The user's access through the designated entry point may be subject to various access constraints. For example, one constraint is that the user must access the data through the designated entry point. The application may require that the user be included in a subscription list that is associated with the entry point. In addition, or in the alternative, the application may require that the user have been authenticated by the authentication service designated in a user partition for the user and must have acquired appropriate tokens for accessing the application. Further, the permission of the user to access data may be application specific and may particularly specify the user's ability to access data across subscriptions. Further control may be exercised through the application 108 itself. For example, a user's access level may be controlled through normal management of access control lists, access levels associated with application roles, direct delegation of access levels, etc.

Each partition can designate a corresponding set of site users and a corresponding authentication service. For example, an administrator for an organization, e.g., an organization administrator, a site administrator or other administrator with sufficient privileges may define user partitions within a site.

Figure 2:
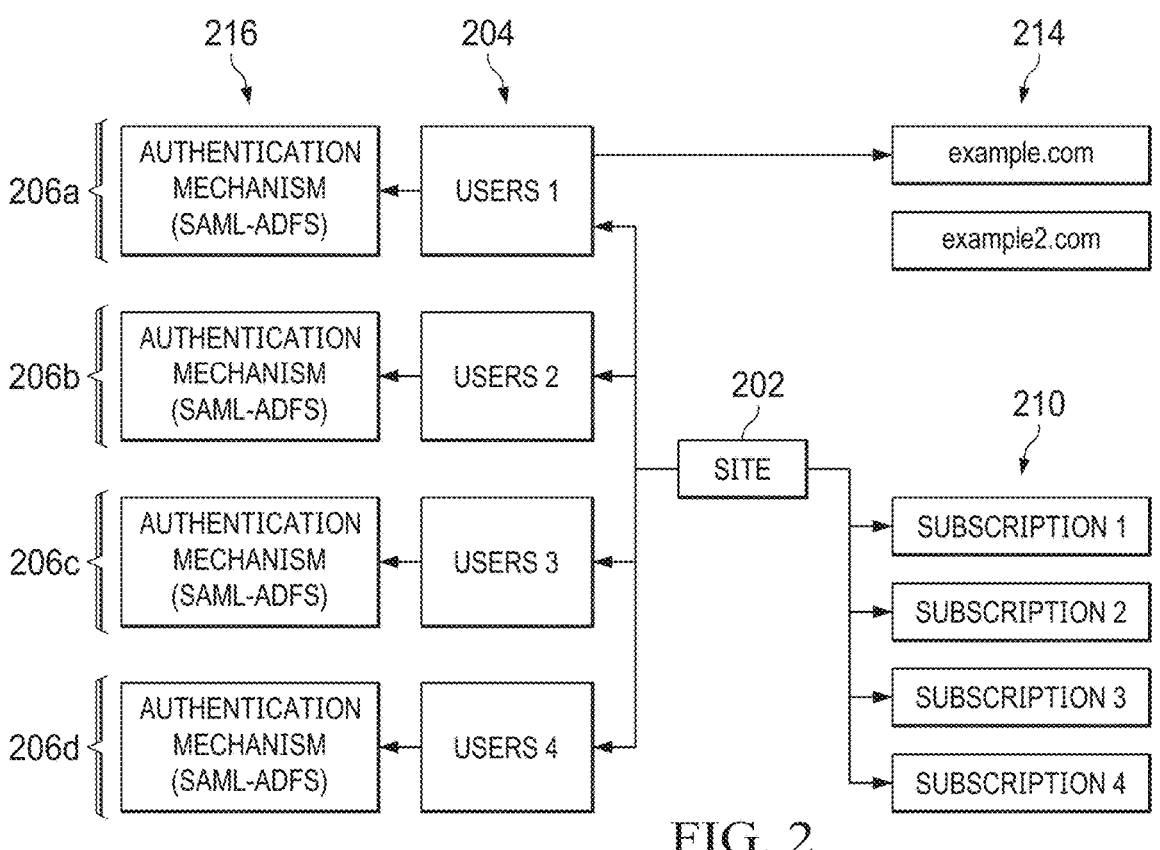
FIG. 2 is a diagrammatic representation of one embodiment of a site in a multitenant platform.

With reference to FIG. 2, the multitenant platform can enable an organization to designate user partitions within a site 202, which may be an example of a site 102 and enable the organization to authorize users to access applications associated with subscriptions. For example, an administrator for an organization, e.g., an organization administrator, a site administrator or other administrator with sufficient privileges, add users 204 to site 202, add subscriptions 210 to site 202 and define user partitions within site 202 (user partitions 206a, 206b, 206c, 206d are indicated). According to one embodiment, the set of users belonging to a site (the site users) (e.g., a set of users defined by an {email, SiteID} combination where each user has the same SiteID) may be considered a site partition. The administrator can further partition site users 204 into one or more child user partitions. In this context, a user partition is a segment of site users that has an associated authentication scheme 216 (e.g., native, Security Assertion Markup Language (SAML), Active Directory Federation Services (ADFS). A site may have any number of user partitions and each user partition may have a defined way of authenticating users within it. A partition can have a registered (validated) DNS domains 214. In some embodiments, the registered domain(s) 214 for a partition can help identify new users as belonging to the partition when logging in to the multitenant platform.

Thus, each site 202 may be made up of multiple subscriptions 210 and user partitions (buckets), and each user partition can then be scoped to authenticate against a specified mechanism. A site 202 can also be associated with multiple domains 214 used for determining the specific site for which an individual is a site user. According to one embodiment, the multitenant platform enables site user access to each of the subscriptions 210 associated with site 202 only if the site user 204 is authenticated by the corresponding authentication service 216 designated in a user partition corresponding to the site user. Thus, the multitenant platform can control access to an organization's data on a site level.

Figure 3:
FIG. 3 is a diagrammatic representation of one embodiment of a multitenant platform authenticating a user.

FIG. 3 is a diagrammatic representation of one embodiment of a multitenant platform 300 that includes executing applications 302. Multitenant platform 300 includes definitions of subscriptions 304, sites 306, organizations 307, users 308, user partitions 310 and authentication schemes 312. An organization hierarchy of sites, subscriptions and users may be defined for each organization 307. As will be appreciated, each of the applications 302 is accessible through a subscription 304 to the application. A subscription 304 is associated with a specific site 306 which may have multiple users 308 associated with it. The users associated with a site are associated with an application through a site's subscription and may therefore be considered subscription users who are authorized to access the application. The subscription users may each be included in one or more user partitions 310 that may be associated with the site. These user partitions 310 may be associated with corresponding authentication services 312 and levels of access, so that when a particular user is assigned to a specific user partition, the user will be authenticated according to the authentication service designated in the user partition and given the levels of access that are associated with the user partition. Sites 306 may be owned by organizations 307.

Multitenant platform 300 further includes microservices including a directory service (DS) 314 and an entitlement and tenancy service (ETS) 316. DS 314 stores users 308, user partitions 310, and authentication schemes 312. As discussed above, users 308 and user partitions 310 may be associated with sites 306 and authentication schemes 312 may be specified for user partitions 310. DS 314 is responsible for authenticating managed users and provides federated login. DS 314 may communicate with other federation servers 315, such as SAML servers, ADFS servers, on-prem servers or other servers as specified by a relevant authentication scheme 312. ETS 316 provides administrator center functionality and a REST API for subscription authorization, tenant management, and application management.

A managed user may log in to a subscription using a client device 320 (represented at line 322). For example, a site owner may provide an entry point for an application. The entry point may comprise a URL that is owned by an organization that owns a site that is subscribed to the application. According to one embodiment, the site owner administers an associated list of authorized users that may login through the URL. (e.g., using email and password). This URL may comprise a login page, where the site owner administers an associated list of authorized users that may login through the URL. In some embodiments, the user is an external user whose email address has a domain which is different than the domain of the site owner.

In any case, the user may attempt to access an application 302 (e.g., via a URL) and be redirected to DS 314. The SiteID with which a subscription that the user is attempting to access is associated may be determined from the URL used or other data. The person may be prompted for an email address or the email address may be otherwise provided to DS 314. Using {email, SiteID}, DS 314 determines the user partition 310 to which the user belongs and implements the appropriate authentication scheme. In some embodiments, DS 314 communicates with an on-prem server, a SAML server, an ADFS server or other server to authenticate the user. If the user authenticates, DS 314 may return a token 326 that includes a uuid for the user and a SiteID to client device 320 (e.g., to a browser on client device 320). Thus, the user is authenticated and acquires a token 326 having subscription scope (i.e., the token identifies the user as a known site-user with access to the subscriptions of the site). Client device 320 provides the token to 326 to ETS 316 and ETS 316 extracts the uuid to identify the user and site id. Based on the uuid and SiteID, ETS 316 determines the subscriptions 304 associated with the SiteID that the user can access and, based on the subscriptions 304, determines entitlements 328 to applications 302. The user may then access applications 302 according to the entitlements 328.

As will be appreciated, sites 306 may act as data isolation boundaries. However, subscriptions within a site 306 can access site data—that is the organization's data that is isolated by the site-across subscriptions. For example, a user who is in two subscriptions 304 associated with the same site for two different applications 302 may be able to use each application to access the same data if the applications 302 provide that functionality. For example, if a user has access to a document via "an HR application" through a subscription 304 associated with a site 306 also has access to a document collaboration application through another subscription 304 associated with the same site 306, the user may also access the document using the document collaboration application. The capability to access site data across subscriptions depends on the details of how the HR application and collaboration application are designed.

As mentioned above, ETS 316 may provide admin center functionality. In some embodiments, multitenant platform 300 allows dedicated internal user authentication for admin center-only access. Admin center functionality can provide a user interface for configuring organizations, sites, authentication schemes, users, subscriptions, and other aspects of multitenant platform 300. In some embodiments, multitenant platform may provide visibility to an organization 307 across the sites 306 it owns.

Referring to FIGS. 4A-4B, a set of tables illustrating the partitioning of users in accordance with some embodiments is shown. FIG. 4A illustrates the partitioning of users at the site level. FIG. 4B illustrates sites for four organizations: Organization 1, Organization 2, Organization 3 and Organization 4. While only a single site is illustrated for each organization, it will be appreciated that a single organization may own multiple sites.

Referring to FIG. 4A, it can be seen that each site can have one or more user partitions within the corresponding site partition. In this example, two sites are indicated: Org_1; org_2, org_3 and org_4. Each of the sites have a native partition. In this example, the native partition holds site users who can authenticate using the multitenant platforms native authentication scheme (for example, simple email, password) without contacting an external authentication system (e.g., an external SAML or ADFS server or on-prem server of the organization). Several sites have additional user partitions. An administrator with appropriate access can specify for each user partition of a site a corresponding domain and a corresponding identity provider (IDP) or authentication service. Thus, for example, Organization 1 can configure, for site Org_1, a user partition identified as Org_1-SAML that uses a SAML authentication scheme. In his example, Org_1-SAML has the domain org1.com, which may be an example of a registered (validated) DNS domain 214 and is configured to use the domain org1.com for the SAML identity provider (IDP) or authentication service.

An administrator with sufficient privileges, for example a site administrator for the relevant site, can also specify users that are associated with the respective user partitions. In addition, or in the alternative, the multitenant platform, for example DS 314, can automatically add email addresses to a user partition based on a registered domain associated with that partition. For example, a multitenant platform may automatically add emails having the org1.com domain to the Org_1-SAML1 partition based on the registered domain associated with the user partition.

In any case, the users included in a user partition may include users that are associated with the organization (which owns the corresponding site), as well as users that are external to the organization. For example, in the example of FIG. 4A, the native partition of site Org_1 included only internal users that are associated with the organization (as identified by the org1.com domain in the user's email address). The partition for site Org_1-SAML3, on the other hand, only includes external users that are associated with the org3.com and org4.com domains. It can be further noted that the user partition Org_1-SAML2 includes users who may be internal to the organization as identified by the org1.eu domain in the user's email address, but are associated with a different domain than the site Org_1. Returning briefly to FIG. 3, if nick@org1.com attempts to log in to a subscription associated with site Org_1, DS 314 will connect to a SAML server to authenticate the user based on nick@org1.com's membership in the Org_1-SAML1 partition.

Referring to FIG. 4B, a table illustrating users' access to the various subscriptions of different sites is shown. In this example, the multitenant platform offers subscriptions to the applications CFS1, CFS2, and CC1. This table identifies sites owned by the organizations, the sites' subscriptions, the users that are allowed access to the subscriptions, and the partitions associated with the users. The left side of the table shows the associations between the sites and their subscriptions. For example, site Org_1 (at domain org1.com) has three subscriptions: Org1-CFSF1, Org1-CFSF2, and Org1-CC1. Site org_2 (at domain org2.com) has subscriptions to the same three applications. Sites org_3 (org3.com) and org_4 (org4.com) have subscriptions to CFS1. The ownership of the subscriptions is indicated by the "Org1-", "Org2-", "Org3-" or "Org4-" in the subscription names.

Each site determines the users that are allowed to access each of its subscriptions based on the list of subscriptions users associated with each subscription. In the example of FIG. 4B, access to subscription Org1-CFSF1 is given to users srini@org1.com, nick@org1.com and ross@org1.eu. Access to subscription org2-CFSF2 is given to users srini@org1.com and ted@org3.com, and access to Org1-CC1 is given to users ravi@org1.com and john@org4.com.

As noted above in connection with FIG. 4A, each site can configure user partitions that allow different users to be segregated into groups that are handled differently, particularly with respect to authentication. Thus, although users srini@org1.com, nick@org1.com and ross@org1.eu each have access to a common subscription (Org1-CFSF1), each of these users is assigned by the site to a different user partition and, hence, will be authenticated according to a different authentication scheme. Specifically, srini@org1.com is assigned to the native partition of the site, nick@org1.com is assigned to partition Org_1-SAML1, and ross@org1.eu is assigned to partition Org_2-SAML2.

Each of the users is authenticated by the authentication service (identity provider) associated with the corresponding partition. Thus, srini@org1.com is authenticated by the default identity provider associated with the Org_1 site (for example, the native authentication provided by the multitenant platform), nick@org1.com is authenticated by a SAML service of org1.com (which is defined for partition Org_1-SAML1), and ross@org1.eu is authenticated by a SAML service for org1.eu (which is the defined identity provider for partition Org_1-SAML2). Each of these three users must therefore be authenticated by a different identity provider prior to accessing subscribed application Org1-CFSF1.

Because each of the users that accesses a particular application is authenticated according to the user partition corresponding to the particular user, the owner of the subscription does not have to rely on the authentication requirements of the domain with which the user is associated. Instead, the subscription owner (the site) can control the authentication requirements by specifying the identity provider that must be used by users in a given user partition in order to access the subscription. Thus, if a user is granted access to multiple, different applications through different sites, the user may be authenticated using different authentication services at different times, providing different levels of security, depending upon which application (and corresponding data) is being accessed.

Effectively, a single person with a single corresponding email address may be considered to be two or more different users that are accessing applications through two or more different sites. Each of these users will have the same email address, but there is no conflict because each user exists only within the context of the corresponding site. When the user logs into a particular site, the corresponding user partition is determined, the user is authenticated according to the user partition, and the authenticated user is given access to the site's subscription(s) according to the partition.

Consider, in the example of FIGS. 4A and 4B, the email address srini@org1.com. This email address is included in the native partitions of each of the Org_1 and org_2 sites. Thus, when srini@org1.com accesses subscription Org1-CFSF1, the user must be authenticated according to the requirements of the Org_1 site, but when the user accesses subscription Org2-CFSF1, the user must be authenticated according to the requirements of the org_2 site. Similarly, ted@org3.com is included in the Org_1-SAML3 user partition of the Org_1 site and the Org_2-SAML2 partition of the org_2 site, so when ted@org3.com accesses the Org1-CFSF2 subscription, it must be authenticated according to org1.okta.com, but when the user accesses the Org_2-CFSF1 subscription, the user must be authenticated according to org2.ping.com.

Figure 5:
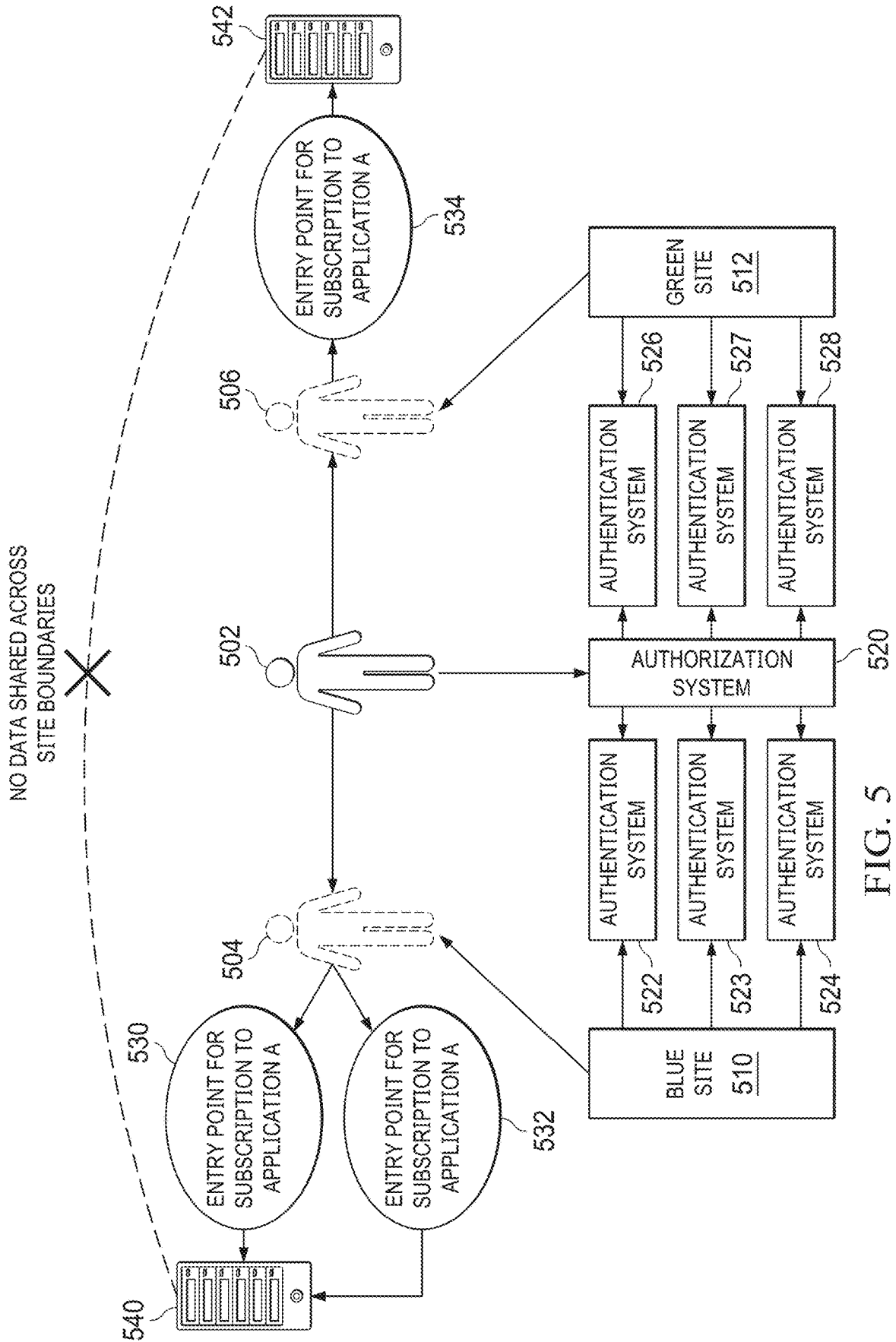
FIG. 5 is a diagrammatic representation of the use of user partitioning to enable a person to access two different websites as two different users according to some embodiments.

The use of the security mechanisms to enable a person to access two different websites as two different users is illustrated in FIG. 5. In this example, a person 502 has a single corresponding email address (email-address@example.com). In a conventional system, this person could only be a single user having this email address, and this user would be authenticated according to the authentication service used by the corresponding domain. In the present embodiments, person 502 can log in to two or more different sites, and will be treated as a different user in each of these sites. The user in each site will fall within a corresponding user partition and will be authenticated by the authentication service designated for the respective one of the sites.

In the example of FIG. 5, person 502 can sign in to a first (blue) site 510 as a first user 504. Site 510 determines the user partition of user 504 and identifies the corresponding one of the authentication systems (522-524) which is designated for the user partition. Person 502 then interacts with the identified one of the authentication systems to authenticate the person as user 504. The authentication system may use any of a variety of authentication methods, such as single-factor, two-factor or multi-factor authentication, and the designated authentication system will have previously been selected by the owner of site 510 based on the sufficiency of the employed authentication methods. Person 502 will also interact with authorization system 520, which will determine whether or not the person is authorized to access the resources of site 510 as user 504.

When person 502 has been authenticated and authorized to access the resources of site 510 as user 504, the user may access one of the application subscriptions of the site through an available entry point. In this case, user 504 may access application A through a first entry point 530 or application B through a second entry point 532 when user 504 accesses the applications through one of these entry points, and access list for the corresponding entry point is checked to ensure that the user is allowed to access the corresponding application. If user 504 is allowed to access the application, access is allowed to the resources on server 540. The user may then proceed to use the application and access data as needed to perform the desired tasks/functions.

While person 502 is logged into the first site (510) as user 504, the person may also log into a second (green) site 512 as a second user 506. User 506 will have the same identifying email address as user 504 but is treated as a separate user. User 506 will login to site 512 in a manner similar to that of user 504. Site 512 will determine a user partition associated with person 502, but the user partitions in this case may be different from those used by site 510. Site 512 may have a different owner than site 510, or may have the same owner, but distinct purposes and requirements which require the use of different user partitions. When site 512 has identified the user partition of user 506, it can identify the designated authentication system (e.g., one of a plurality of authentication systems 526-528), and person 502 will proceed to authenticate user 506 with the designated authentication system. Person 502 will further interact with authorization system 520, and this system will determine whether or not the person is authorized to access the resources of site 512 as user 506.

When user 506 has been authenticated and it has been determined that the user is authorized to access the resources of site 512, the user may attempt to access the resources through an application having a corresponding entry 534. In this example, only a single-entry point is available to allow user 506 to access the resources of site 512. When user 506 attempts to access this entry point, a corresponding access list is examined to determine whether or not the user has been granted access to the application via the entry point. If user 506 is included on the access list for the entry point, the user is allowed to proceed to access the resources on server 542.

As noted above, users 504 and 506, although having a common email address, are treated as different users. Consequently, although a single person having a single email address is accessing the resources of both site 510 and 512, the system does not share data across the site boundaries.

Figure 6:
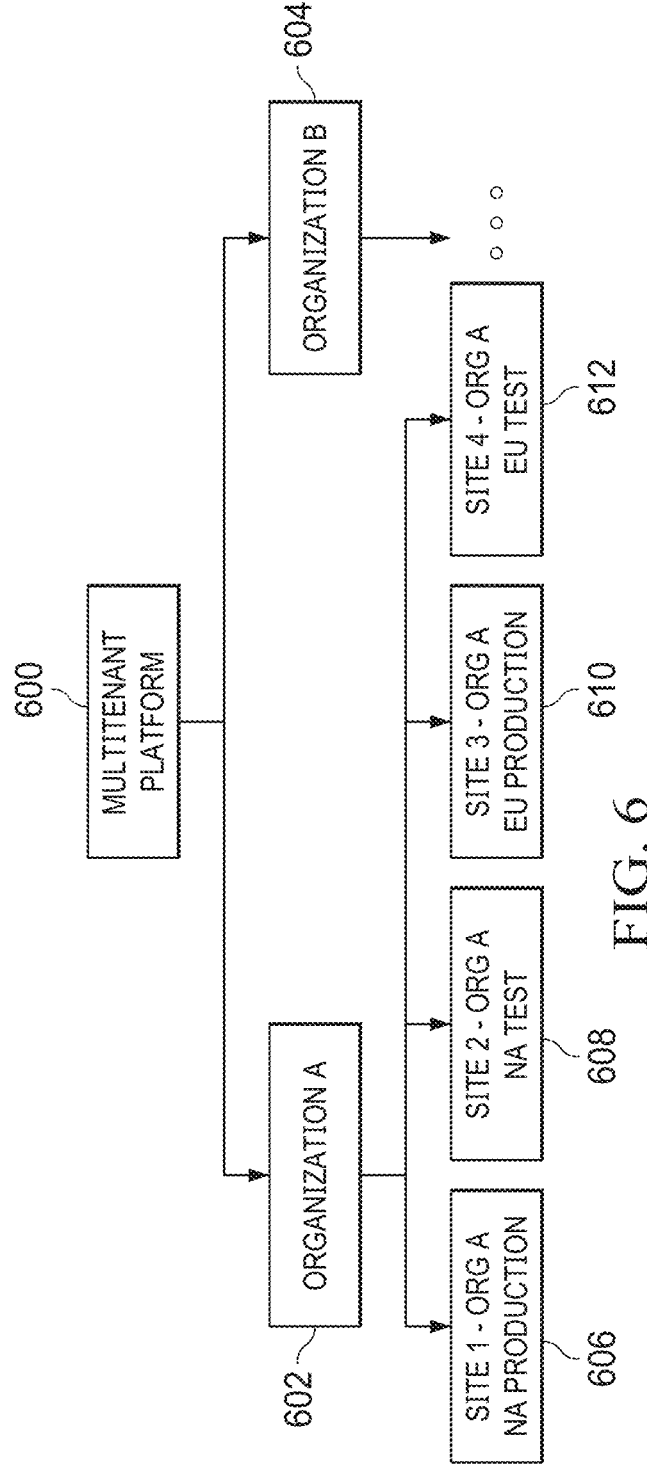
FIG. 6 illustrates an embodiment in which a multitenant platform has several instances and an organization several sites.

Embodiments described herein provide a number of advantages. For example, embodiments may support multiple environments with separate users for each. For example, FIG. 6 illustrates an embodiment in which a multitenant platform 600 has several instances (e.g., a North American instance and a European instance). Several organizations may be defined in multitenant platform, such as Organization A 602 and Organization B 604. Each organization may own several sites defined in multitenant platform 600. For example, an organization administrator for Organization A may define sites, such as Site1: Org A North America Production 606, Site 2: Org A North America Test 608, Site 3: Org A EU Production 610 and Site 4: Org A EU Test 612. Site1: Org A North America Production 606 and Site 2: Org A North America Test 608 may be accessible through the North American instance of multitenant platform 600 and Site 3: Org A EU Production 610 and Site 4: Org A EU Test 612 may be accessible through the European Union instance of multitenant platform 600. In any case, each site can have its own users and subscriptions to applications of multitenant platform 600. A person using the same email address can authenticate differently depending on the site in which they authenticate against. Moreover, multitenant platform 600 can support multiple authentication schemes per site. Thus, different users may be required to use different authentication schemes for the same site depending on user partition.

According to one embodiment, a multitenant platform such as discussed above can provide a customer with sites to have visibility across them. For example, a multitenant platform can provide a user interface to a user associated with an organization to allow the user to view information related to multiple sites owned by the organization in the multitenant platform. An organization administrator can thus have visibility to site activity across multiple sites. For example, multitenant platform 600 can provide an interface to allow an organization administrator associated with Organization A to view activity across sites 606, 608, 610, 612. Moreover, the organization administrator may define orgwide policies at the organization level that are effective to all sites associated with the organization.

FIG. 7 is a diagrammatic representation of a user interface 700 provided to an organization administrator to provide visibility across sites. In this example, a dashboard interface is illustrated for Organization 1, which owns three sites "Org_1," "Org_1b" and "Org_1c" and has subscriptions associated with the sites. The organization administrator can be given tools to drill down into each site to see or configure, for example, users associated with each site, user partitions, subscriptions. The user interface may also allow an organization administrator to aggregate data across sites. For example, the organization administrator may be given tools to aggregate billing across sites owned by the organization. The tenancy model that utilizes organizations may thus facilitate various processes related to an organization. For example, billing and other processes can be aggregated at the organization level across the organization's sites.

Figure 8:
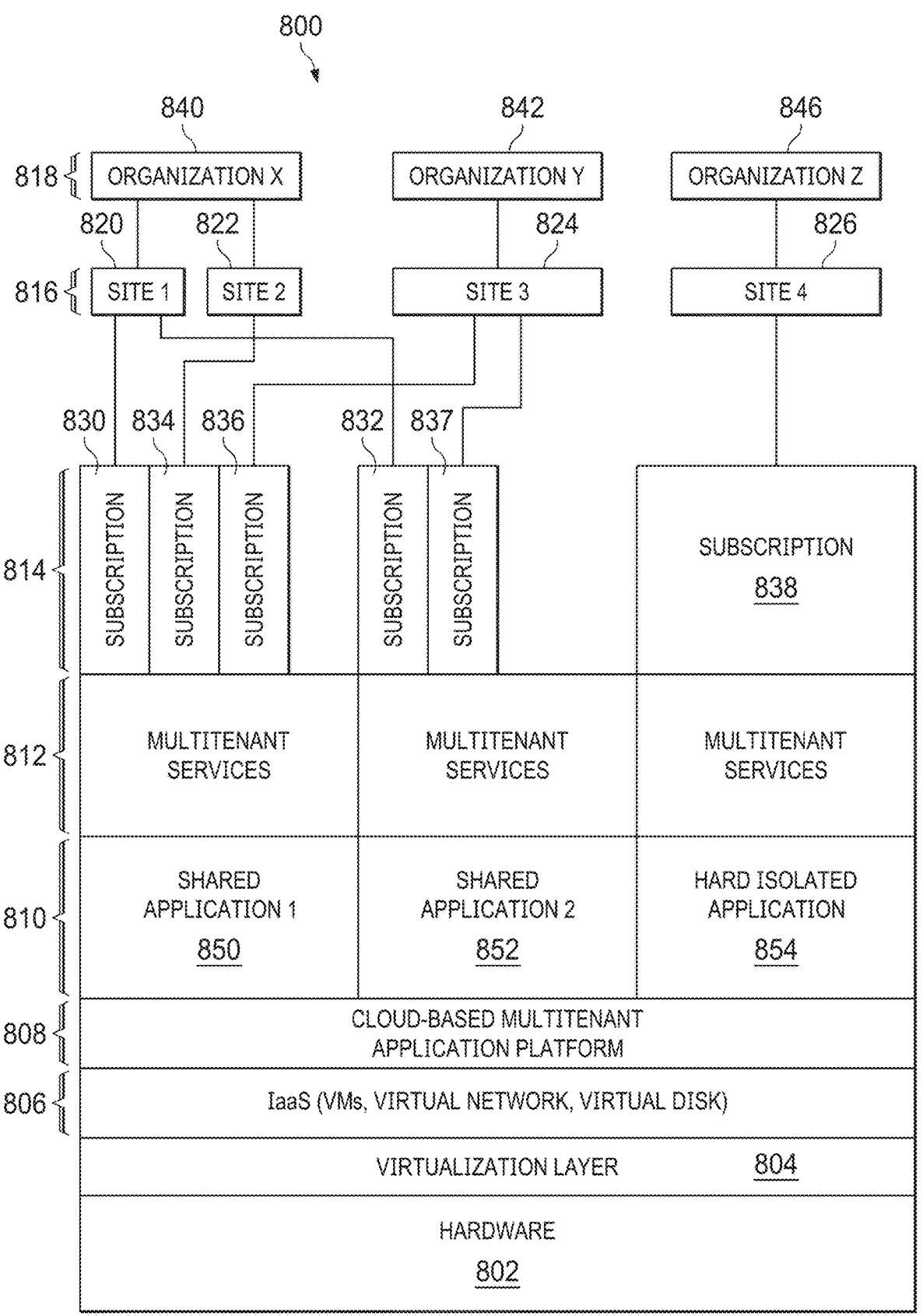
FIG. 8 is a diagrammatic representation of one embodiment of a multitenant platform.

Referring to FIG. 8, a diagrammatic representation of one embodiment of a multitenant platform 800 is illustrated. As depicted in this figure, a virtualization platform runs on a hardware layer 802. Virtualization platform includes a virtualization layer 804 comprising virtual machines or containers. The virtual machines or containers of the virtualization layer 804 support an IaaS (infrastructure as a service) layer 806. There may be several infrastructure tenants 810 that utilize the provided infrastructure for the cloud-based multitenant application platform 808. At this level, deep isolation between the tenants may be provided by implementing separate tables and services for the different tenants. The separate isolation segments may be useful to allow developers to work without disrupting production and may provide a level of isolation required by highly risk-adverse customers. Various services 812 may be built within container boundaries that are provisioned on the cloud-based platform. Multitenant applications that use these services can then be provided to sites 816 of the cloud-based platform. The sites may belong to organization 818 and have subscription-based access to the applications.

Each site may have subscriptions 814 to one or more applications that are executing on the multitenant platform. A site can have its own users who are associated with the site. Each site manages its own users and allows these users to access the application through its subscription. For example, a first site 820 may have subscription 830 to a first application 850 and a subscription 832 to a second application 852. Second site 822 may have a subscription 834 to first application 850. Site 824 may have a subscription 836 to first application 850 and a subscription 837 to second application 852. Site 826 may have a subscription 838 to third application 854. Application 854 is an example of an application that is dedicated to a single site 826 and organization 846 through a corresponding subscription 838.

Site 820 and site 822 are owned by organization 840, site 824 is owned by organization 842 and site 826 is owned by organization 846. Each site may have users from the organization to which the site belongs and users external to the organization. For example, site 820 may have associated users from within the enterprise corresponding to organization 840 and users external to the enterprise. For example, site 822 may include users from organization 840, organization 842 or organization 846. As discussed above, user partitions can be implemented to facilitate control of access to a site's data.

Figure 9:
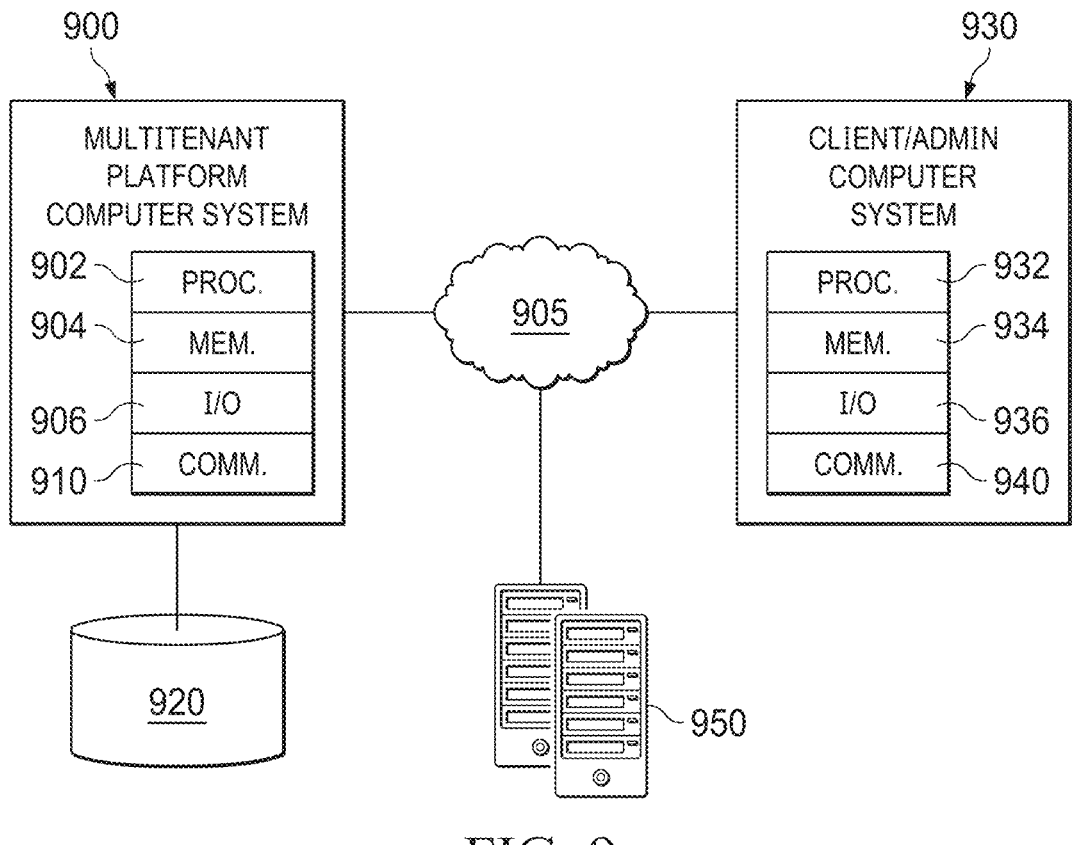
FIG. 9 is a diagrammatic representation of a distributed network computing environment where embodiments disclosed can be implemented.

Embodiments of the technology may be implemented on a computing system. Any combination of mobile desktop, server, embedded or other types of hardware may be used. FIG. 9 is a diagrammatic representation of one embodiment of a distributed network computing environment 900 where embodiments disclosed herein can be implemented. The computing environment includes a first computer system 900 and a second computer system 930 connected to a network 905 (e.g., a local area network (LAN), a wide area network (WAN) such as the Internet, mobile network, or other type of network or combination thereof). Network 905 may represent a combination of wired and wireless networks that network computing environment 900 may utilize for various types of network communications.

First computer system 900 may include, for example, a computer processor 902 and associated memory 904. Computer processor 902 may be an integrated circuit for processing instructions. For example, processor 902 may comprise one or more cores or micro-cores of a processor. Memory 904 may include volatile memory, non-volatile memory, semi-volatile memory, or a combination thereof. Memory 904, for example, may include RAM, ROM, flash memory, a hard disk drive, a solid-state drive, an optical storage medium (e.g., CD-ROM), or other computer readable memory or combination thereof. Memory 904 may implement a storage hierarchy that includes cache memory, primary memory, or secondary memory. In some embodiments, memory 904 may include storage space on a data storage array. First computer system 900 may also include input/output ("I/O") devices 906, such as a keyboard, monitor, printer, electronic pointing device (e.g., mouse, trackball, stylus, etc.), or the like. First computer system 900 may also include a communication interface 910, such as a network interface card, to interface with network 905.

Memory 904 may store instructions executable by processor 902. For example, memory 904 may include instructions executable to implement a multitenant platform, such as multitenant platform 300, multitenant platform 600 or multitenant platform 800. In some embodiments, the first computer system may represent a cloud computing system that provides a multitenant platform. First computer system 900 may represent, for example, a plurality of servers.

First computer system 900 may be coupled to a data store 920 that stores data usable by the multitenant platform. According to one embodiment, data store 920 may comprise one or more databases, one or more file systems or a combination thereof. In some embodiments, data store 920 may be a portion of memory 904.

Second computer system 930 may include, for example, a computer processor 932 and associated memory 934. Computer processor 932 may be an integrated circuit for processing instructions. For example, processor 932 may comprise one or more cores or micro-cores of a processor. Memory 934 may include volatile memory, non-volatile memory, semi-volatile memory, or a combination thereof. Memory 934, for example, may include RAM, ROM, flash memory, a hard disk drive, a solid-state drive, an optical storage medium (e.g., CD-ROM), or other computer readable memory or combination thereof. Memory 934 may implement a storage hierarchy that includes cache memory, primary memory, or secondary memory. In some embodiments, memory 934 may include storage space on a data storage array. Second computer system 930 may also have I/O devices 936. Second computer system 930 may also include a communication interface 940, such as a network interface card, to interface with network 905.

Memory 934 may store instructions executable by processor 932. For example, memory 934 may include one or more programs, such as a web browser, that may interact with the services of a multitenant platform. Second computer system 930 may represent a client computer system of a user or administrator. While only one computer system 930 is illustrated, there may be a large number of second computer systems 930 connected to first computer system 900.

A distributed network system may include other computer systems. For example, computer system 900 or computer system 930 may communicate with various server 950, SAML servers, ADFS servers, on-prem servers, servers provided by third-party authentication or identify management services or other servers.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage media and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A computer-implemented method for managing access to data in a multitenant environment, the method comprising:

defining an organization hierarchy in a multitenant platform that provides site-level subscription-based access to one or more applications, the organization hierarchy comprising a first organization, a plurality of sites owned by the first organization, and site-level subscriptions to applications, wherein the plurality of sites represent data isolation boundaries for data of the first organization; and providing a user interface to an organization administrator associated with the first organization, the user interface providing a unified view of the first organization, the unified view showing the organization hierarchy for the first organization including the plurality of sites owned by the first organization and relationships between the sites in the plurality of sites and the site-level subscriptions, the unified view providing a tool to allow the organization administrator to aggregate data across the plurality of sites.

2. The computer-implemented method of claim 1, further comprising:

receiving definitions for a plurality of user partitions for a first site from the plurality of sites, each user partition from the plurality of user partitions having an associated authentication service and a segment of site users belonging to the first site;

receiving a first user identifier for a first user who is attempting to access a first application through the first site from the plurality of sites, the first site having a first site-level subscription to the first application;

determining that the first user is a member of a first user partition from the plurality of user partitions defined for the first site; and based on a determination that the first user is a member of the first user partition, authenticating the first user to use the first application using a first authentication service.

3. The computer-implemented method of claim 2, further comprising:

receiving a user identifier for a second user who is attempting to access the first application through the first site from the plurality of sites;

determining that the second user is a member of a second user partition, wherein the second user partition is defined for the first site; and based on a determination that the second user is a member of the second user partition, authenticating the second user to use the first application using a second authentication service.

4. The computer-implemented method of claim 3, further comprising:

receiving a second user identifier for the first user attempting to access the first application through a second site from the plurality of sites, the second site having a second site-level subscription to the first application;

determining that the first user is a member of a third user partition, wherein the third user partition is defined for the second site and is associated with a third authentication service; and based on a determination that the first user is a member of the third user partition, authenticating the first user to use the first application according to the second site-level subscription.

5. The method of claim 4, wherein the first user identifier for the first user and the second user identifier for the first user comprise a common email address for the first user, wherein access of the first user to the first site-level subscription is isolated from access of the first user to the second site-level subscription.

6. The method of claim 5, wherein the common email address has a domain that is different from a domain of the first site.

7. The method of claim 5, the first user identifier for the first user comprises a site identifier for the first site and the second user identifier for the first user comprises a site identifier for the second site.

8. The method of claim 5, wherein the user identifier for the second user comprises an email address of the second user, wherein the second user is identified in the second user partition by the email address of the second user, and wherein the second user is external to the first organization.

9. A computer program product for controlling access to data in a multitenant environment, the computer program product comprising a non-transitory, computer-readable medium storing instructions executable by a processor to cause the processor to perform:

defining an organization hierarchy in a multitenant platform that provides site-level subscription-based access to one or more applications, the organization hierarchy comprising a first organization, a plurality of sites owned by the first organization, and site-level subscriptions to applications, wherein the plurality of sites represent data isolation boundaries for data of the first organization; and providing a user interface to an organization administrator associated with the first organization, the user interface providing a unified view of the first organization, the unified view showing the organization hierarchy for the first organization including the plurality of sites owned by the first organization and relationships between the sites in the plurality of sites and the site-level subscriptions, the unified view providing a tool to allow the organization administrator to aggregate data across the plurality of sites.

10. The computer program product of claim 9, wherein the non-transitory, computer-readable medium further stores instructions executable by the processor to cause the processor to perform:

receiving definitions for a plurality of user partitions for a first site from the plurality of sites each user partition from the plurality of user partitions having an associated authentication service and a segment of site users belonging to the first site;

receiving a first user identifier for a first user who is attempting to access a first application through the first site from the plurality of sites, the first site having a first site-level subscription to the first application;

determining that the first user is a member of a first user partition from the plurality of user partitions defined for the first site; and based on a determination that the first user is a member of the first user partition, authenticating the first user to use the first application using a first authentication service.

11. The computer program product of claim 10, wherein the non-transitory, computer-readable medium further stores instructions executable by the processor to cause the processor to perform:

receiving a user identifier for a second user who is attempting to access the first application through the first site from the plurality of sites;

determining that the second user is a member of a second user partition, wherein the second user partition is defined for the first site; and based on a determination that the second user is a member of the second user partition, authenticating the second user to use the first application using a second authentication service.

12. The computer program product of claim 11, wherein the non-transitory, computer-readable medium further stores instructions executable by the processor to cause the processor to perform:

receiving a second user identifier for the first user attempting to access the first application through a second site from the plurality of sites, the second site having a second site-level subscription to the first application;

determining that the first user is a member of a third user partition, wherein the third user partition is defined for the second site and is associated with a third authentication service; and based on a determination that the first user is a member of the third user partition, authenticating the first user to use the first application according to the second site-level subscription.

13. The computer program product of claim 12, wherein the first user identifier for the first user and the second user identifier for the first user comprise a common email address for the first user, wherein access of the first user to the first site-level subscription is isolated from access of the first user to the second site-level subscription.

14. The computer program product of claim 13, wherein the common email address has a domain that is different from a domain of the first site.

15. The computer program product of claim 13, the first user identifier for the first user comprises a site identifier for the first site and the second user identifier for the first user comprises a site identifier for the second site.

16. The computer program product of claim 13, wherein the user identifier for the second user comprises an email address of the second user, wherein the second user is in the second user partition by the email address of the second user, and wherein the second user is external to the first organization.

17. A multi-tenant system comprising:
a processor;
a memory coupled to the processor, the memory storing multi-tenant software code, the multi-tenant software code comprising instructions for:

defining an organization hierarchy in a multitenant platform that provides site-level subscription-based access to one or more applications, the organization hierarchy comprising an organization, a plurality of sites owned by the organization, site-level subscriptions to applications, and user partitions for the plurality of sites, each user partition defining a membership and having an associated authentication service, wherein the plurality of sites represent data isolation boundaries for data of the organization;

providing a user interface to an organization administrator associated with the organization, the user interface providing a unified view of the organization, the unified view showing the organization hierarchy for the organization including the plurality of sites owned by the organization and relationships between the sites in the plurality of sites and the site-level subscriptions, the unified view providing a tool to allow the organization administrator to aggregate data across the plurality of sites; and authenticating users to access the site-level subscriptions of the plurality of sites according to the user partitions and the authentication services associated with the user partitions.

18. The multi-tenant system of claim 17, wherein authenticating users to access the site-level subscriptions of the plurality of sites according to the user partitions and the authentication services associated with the user partitions comprises:

receiving definitions for a plurality of user partitions for a first site from the plurality of sites each user partition from the plurality of user partitions having an associated authentication service and a segment of site users belonging to the first site;

authenticating a first user to use a first site-level subscription of the first site to an application based on the first user being a member of a first user partition from the plurality of user partitions defined for the first site; and authenticating the first user to use a second site-level subscription of a second site to the application based on the first user being a member of a second user partition, the second user partition defined for the second site, wherein access of the first user to the first site-level subscription is isolated from access of the first user to the second site-level subscription.

19. The multi-tenant system of claim 18, wherein the first user is identified, for the first site, by an email address and site identifier for the first site, and is identified, for the second site, by the same email address and a site identifier for the second site.

20. The multi-tenant system of claim 19, wherein the email address is external to a domain of at least one of the first site or the second site.

* * * * *